United States Patent [19]

Mollison

[11] Patent Number: 4,461,808
[45] Date of Patent: Jul. 24, 1984

[54] FILMS FROM NYLON BLENDS HAVING A MOISTURE CONTENT OF 0.75 TO 2.25 WEIGHT PERCENT

[75] Inventor: Alistair N. Mollison, Kingston, Canada

[73] Assignee: Du Pont Canada Inc., Mississauga, Canada

[21] Appl. No.: 489,098

[22] Filed: Apr. 27, 1983

[51] Int. Cl.³ .............................................. B32B 27/10
[52] U.S. Cl. .............................. 428/475.8; 428/475.5; 428/910; 525/432
[58] Field of Search .................. 428/475.5, 475.8, 910, 428/476.1; 525/432

[56] References Cited

U.S. PATENT DOCUMENTS

| 3,370,972 | 2/1968 | Nagel et al. | 428/475.8 |
| 3,995,084 | 12/1976 | Berger et al. | 428/475.5 |
| 4,322,480 | 3/1982 | Tulber et al. | 428/475.8 |
| 4,404,317 | 9/1983 | Epstein et al. | 525/432 |

FOREIGN PATENT DOCUMENTS 750973  1/1967  Canada ................................ 525/432

Primary Examiner—Marion McCamish
Assistant Examiner—Beverly K. Johnson

[57] ABSTRACT

The present invention provides an oriented film made from a blend of nylon 66 with another nylon selected from the group consisting of nylon 6, nylon 11, nylon 12 and nylon 6,12 and having a moisture content of from 0.75 to 2.25% by weight. The weight proportions of nylon 66 to the other nylon are in the range of from 94:6 to 10:90. Such films are suitable for laminating to a sealant web, for food packaging applications.

11 Claims, No Drawings

FILMS FROM NYLON BLENDS HAVING A MOISTURE CONTENT OF 0.75 TO 2.25 WEIGHT PERCENT

The present invention relates to oriented nylon film and more especially to the lamination of such oriented nylon film to a sealant web.

The term "sealant web" as used herein refers to films which may be heat-sealed to themselves. Films encompassed by such term include films made from so-called high pressure polyethylene, so-called linear low density polyethylene, ethylene-vinyl acetate copolymers, ionomers, polyvinylchloride and blends thereof.

It is known that nylon or polyester films are useful as part of multilayer film structures for packaging certain foods. Oriented nylon or polyester film, laminated to a sealant web e.g. polyethylene may be used for packaging meats, cheese, coffee and other comestibles. In applications where deterioration of food by oxidation is sought to be prevented or minimized, a layer of crystalline vinylidene chloride copolymer is usually sandwiched between the nylon or polyester film and the sealant web.

Oriented nylon 6 (poly ϵ-caproamide) film is often used instead of polyester film, in order to give better clarity, lower oxygen permeability and better resistance to pinholing of the film composite. Oriented nylon 66 (polyhexamethyleneadipamide) film may be used instead of polyester or nylon 6 films because it is stiffer than nylon 6 film and is clearer than polyester film. Stiffness is important where precision printing is required. Oriented nylon 6 film suffers in comparison to oriented nylon 66 or polyester films in that it is not as dimensionally stable at temperatures above about 130° C.

U.S. Pat. No. 3,995,084 issued Nov. 30, 1976 to Berger et al discloses unoriented films of a nylon 6—nylon 66 blend of about 50–80 percent by weight nylon 6 and 50–20 percent by weight nylon 66. These films are reported to have haze values, as measured by ASTM procedure D-1003, of between 5 to 20%. Such films are indicated to be thermoformable and heat sealable, suitable for retort pouches.

U.S. Pat. No. 4,095,012 issued June 13, 1978 to H. G. Schirmer discloses a laminate comprising a film of a nylon 6—nylon 66 blend of about 20–80% by weight nylon 6 and 80–20% by weight nylon 66 laminated to olefin polymers and copolymers. Schirmer indicated that the nylon is extruded in a moisture-free atmosphere, and that the film so extruded must be stretch-oriented within a short time after extrusion.

Other patents e.g. Canadian patent 897 885 issued Apr. 11, 1972 to F. H. Simons, refer to blends or copolymers which may be used in making textile fibres, but which do not appear to be suitable for making films.

None of the prior art appears to provide a film composite having a nylon film which is stiff, dimensionally stable at temperatures above about 130° C., has good optical properties i.e. is clear, and has good pinhole resistance.

Accordingly the present invention provides an oriented nylon film made from a blend of nylon 66 and another nylon selected from the group consisting of nylon 6, nylon 11, nylon 12 and nylon 6,12, the weight proportions of said nylon 66 to said other nylon being in the range of from 94:6 to 10:90, said nylon film having a moisture content of from about 0.75 to about 2.25 wt. %.

In a preferred embodiment the weight proportions of nylon 66 to said other nylon is in the range of from 94:6 to 50:50 and especially from 92:8 to 75:25.

In another embodiment the oriented film is a monoaxially machine-direction oriented film, preferably oriented in the machine direction at a draw ratio of between about 1.1 and 5.5. More preferably the draw ratio is between about 2.6 and 4.8, especially between about 3.0 to 4.2.

In a preferred embodiment said other nylon is nylon 6, especially in the weight proportion in the range of 92:8 to 75:25 of nylon 66 to nylon 6.

The present invention further provides a multilayer film comprising an oriented nylon film made from a blend of nylon 66 and another nylon selected from the group consisting of nylon 6, nylon 11, nylon 12 and nylon 6,12, the weight proportions of said nylon 66 to said other nylon being in the range of from 94:6 to 10:90 and having a moisture content of from about 0.75 to about 2.25 wt. %, and a sealant web.

In a preferred embodiment the weight proportions of nylon 66 to said other nylon is in the range of from 94:6 to 50:50, and especially from 92:8 to 75:25.

In another embodiment the oriented nylon film is a monoaxially machine-direction oriented film, preferably oriented in the machine direction at a draw ratio of between about 1.1 and 5.5. More preferably the draw ratio is between about 2.6 and 4.8, especially between about 3.0 to 4.2.

In a preferred embodiment said other nylon is nylon 6, especially in the weight proportion in the range of 92:8 to 75:25 of nylon 66 to nylon 6.

In a further embodiment the sealant web is selected from the group consisting of polyethylene, ethylene vinyl acetate copolymers, ionomer, polyvinylchloride and blends thereof, said sealant web being extrusion coated onto the oriented nylon film.

In another embodiment the sealant web is selected from the group consisting of polyethylene, ethylene vinyl acetate copolymers, ionomers, polyvinylchloride and blends thereof, said sealant web being laminated to the oriented nylon film using an adhesive. Preferably the adhesive is a polyurethane adhesive.

In yet another embodiment a layer of crystalline vinylidene chloride copolymer is sandwiched between the oriented nylon copolymer film and the sealant web.

In a further embodiment of the present invention the oriented nylon film is between 10 and 38 μm in thickness.

Preferably the nylon film has a moisture content of from about 1.0 to 2.0 wt. %.

As used herein, the term "draw ratio" refers to ratio of the machine direction speed of the film after orientation to the machine direction speed of the film prior to orientation.

It will be understood by those skilled in the art that the nylon blend may contain additives e.g. pigments, slip additives, anti-block additives, known in the art to aid in its manufacture or subsequent processing or to colour the film, for example.

Nylon 6 and nylon 66 useful in the present invention may be made by known batch or continuous polymerization processes. These polymers, in flake or pellet form, may be dry blended or melt blended together in the required proportions by known methods.

The nylon blend used in the present invention may be extruded by known methods e.g. through a flat die. When extruded through a flat die the blend film may be monoaxially oriented by a process similar to that disclosed in Canadian Pat. No. 1 011 520 issued June 7, 1977 of I. K. MacGregor.

Preferably, however, the nylon blend may be oriented by a process similar to that disclosed in Applicant's copending patent application Ser. No. 467,823 filed Feb. 18, 1983. Film oriented accordingly has good film flatness, a property of particular importance where the oriented nylon film is to be printed. In the process of Ser. No. 467,823, cast film made from the nylon 66/other nylon blend of the present invention is machine-direction oriented in a narrow-gap orientation process in which the force on each nip roll associated with the orientation rolls is between about 15 and 45 N/cm length of nip roll.

The nylon film of the present invention should be monoaxially oriented at a draw ratio between about 1.1 and 5.5, preferably between about 2.6 and 4.8, especially from 3.0 to 4.2.

Alternatively, the film of the blend may be biaxially oriented by known methods e.g. tenter stretching.

The orientation may be performed at temperatures between 70° C. and 180° C., preferably between 140° C. and 170° C. It is further preferred that the oriented nylon blend film be heat set at a temperature in the range of the orientation temperature and 20° C. below the melting temperature of the blend. Preferably, heat setting should be at a temperature between the orientation temperature and 30° C. below the melting temperature of the blend.

Moisturizing of the film may be accomplished at any time prior to use. However, but it is preferred to moisturize the film between casting and orienting in order to plasticize the film and thus facilitate the orientation process by, for example, lessening the chance of breakage of the film. Moisturizing to the required level is most advantageously accomplished by passing the film, prior to orientation, through a steam chest. Preferably the steam in the steam chest is at a relative humidity of from about 60 to 99% at a temperature of from about 30° to 70° C. The moisture content in the film may be determined by measuring the weight loss of the film after 1 hr. at 105° C.

As indicated hereinabove, film may be moisturized prior to orientation. It is also desirable that the film be moisturized after orientation, and more preferably after being heat set, prior to being wound up on a roll.

In the case where film is extruded, moisturized, not oriented, wound up on a roll and stored for orientation at a subsequent time it may be desirable to remoisturize the film in the subsequent orientation step. Subsequent orientation may take place at any time e.g. 1–2 weeks, after extrusion. In such case the unoriented film may be moisturized prior to winding up on a roll. If the unoriented film is moisturized, the length of time of storage and the dryness of the place of storage may dictate that the film be subjected to a further moisturizing step in the subsequent orientation process in order to bring the moisture content of the oriented film to a level of from 0.75 to 2.25 wt. %.

The residence time of the film in the steam chest is easily determined through simple experimentation. Generally residence times between about 1 and 10 seconds suffice. For example, and oriented film of about 51 μm in thickness would require a residence time of about 2 seconds in a steam chest wherein the steam is at 95% RH (relative humidity) at 45° C., in order to moisturize the film to a level of from about 1 to about 2 wt. %.

Moisturizing the film improves the pinhole resistance of the film and imparts better dimensional stability thereto, e.g. reduces the machine direction shrinkage of the film.

The oriented nylon blend film is advantageously combined with a sealant web. The nylon film provides the required properties of printability, oxygen permeability, clarity, stiffness and dimensional stability, while the sealant web provides a heat sealable layer for heat sealing the edges of packages. This multilayer film may be formed in a number of ways.

One method of making the multilayer film is to extrusion coat the moisturized oriented nylon film with the sealant web by known extrusion coating methods. Sealant webs useful in this process include polyethylenes and ethylene vinyl acetate copolymers.

Another method of making the multilayer film is to laminate the sealant to the moisturized oriented nylon film with a suitable adhesive. One such adhesive is a single component polyurethane adhesive. Such laminating processes are well known in the art.

Preferred sealant webs are films made from linear low density polyethylenes or blends of a linear low density polyethylene with a high pressure polyethylene or an ethylene vinyl acetate copolymer. Preferred linear low density polyethylenes are copolymers of ethylene and $C_4$–$C_{10}$ α-olefins, having a density between 0.915 g/cm$^3$ and 0.945 g/cm$^3$. Particularly preferred are copolymers of ethylene and butene-1, and ethylene and octene-1.

If a multilayer film having a very low oxygen permeability is desired, a layer of crystalline vinylidene chloride copolymer may be placed between the nylon film and the polyethylene film. This may be accomplished in several ways e.g. using a polyurethane primer between the nylon film and the vinylidene chloride copolymer, similar to the method disclosed in Canadian patent 851 140 issued Sept. 8, 1970 to D. G. James, and then laminating e.g. with a polyurethane adhesive, the polyethylene film to the layer of vinylidene chloride copolymer.

Alternatively the vinylidene chloride copolymer may be laid on the nylon film using an amorphous vinylidene chloride copolymer primer and a crystalline vinylidene chloride copolymer, as disclosed in copending patent application No. 408 492.

The present invention provides a film which has good dimensional stability e.g. 2–3% in the machine direction and 0% in the transverse direction, at 149° C.

The following tables shows the benefits of moisturized oriented film of the present invention made from a blend of nylon 66 and nylon 6 compared to nylon 6 and nylon 66 films.

| Nylon Film | Machine Direction Draw Ratio | Modulus (psi) | | | Gelbo Flex (pinholes/ 100 in$^2$) | Haze | Elmendorf Tear (g/mil) | |
|---|---|---|---|---|---|---|---|---|
| | | TD | MD | TD/MD | | | MD | TD |
| Nylon 6 | 4.1 | 338 000 | 278 000 | 1.22 | 45 | 2.7 | 116 | 82 |

| Nylon Film | Machine Direction Draw Ratio | Modulus (psi) TD | Modulus (psi) MD | TD/MD | Gelbo Flex (pinholes/100 in$^2$) | Haze | Elmendorf Tear (g/mil) MD | Elmendorf Tear (g/mil) TD |
| --- | --- | --- | --- | --- | --- | --- | --- | --- |
| Nylon 66 | 4.1 | 436 000 | 464 000 | 0.94 | 106 | 2.0 | 139 | 99 |
| Blend A | 3.85 | 270 000 | 305 000 | 0.89 | 59 | 2.1 | 170 | 150 |
| Blend B | 3.8 | 290 000 | 275 000 | 1.05 | 38 | 2.3 | 175 | 125 |
| Polyester | (biaxially oriented) | 550 000 | 550 000 | 1.0 | 71 | 6.5 | 10 | 10 |

Blend A comprised 10 parts by weight of nylon 6 blended with 90 parts by weight of nylon 66. Blend B comprised 20 parts by weight of nylon 6 and 80 parts by weight of nylon 66. Gelbo Flex is a measure of the pinhole resistance of the film being tested and is measured using a Gelbo Flex tester catalogue No. TMI 31-5 supplied by Testing Machines Inc. of Amityville, N.Y. The figures are for 3000 cycles. Modulus is measured by ASTM procedure No. D882-79. Haze is measured by ASTM procedure No. D 1003.

The most preferred embodiment of the present invention comprises an oriented film of a blend of nylon 66 and nylon 6 containing 1 to 2% by weight moisture. Preferably such oriented film is laminated to a polyethylene film.

The examples following serve to illustrate the invention further. The relative viscosity (RV) of the nylons was determined by comparing the viscosity of an 8.4% by weight solution of the nylon in 90%—10% formic acid—water solvent to that of the formic acid—water solvent. Other test methods used were: ASTM procedure D-638-77A, sample Type IV for ultimate tensile strength (UTS); ASTM procedure D-1004 for Graves tear strength; and ASTM procedure D-1922-67 for Elmendorf tear strength.

EXAMPLE 1

90 parts by weight of nylon 66, having a relative viscosity of 42, was dry blended with 10 parts by weight of nylon 6, having an RV of 60. The blend was extruded at 600 kg/hr at 283° C., using a twin-screw extruder, through a flat film die. The film so extruded had an RV of 53. The extruded film was passed over a chill roll set at 75° C., an annealing roll set at 105° C. and passed through a steam chest with steam at 96% RH and 43° C. for a period of 3 seconds before being wound up in a roll at a speed of 1.12 m/s. The thickness of the film so produced was 51 μm. About a week later the film was pulled from the roll and passed over a preheat roll set at 167° C., prior to being oriented between first and second orientation rolls set at 167° C. and 200° C. respectively and then quenched on a quench roll set at 40° C. The film was allowed to shrink about 1.5% in the annealing zone between the second orientation roll and the quench roll during which time the film was moisturized in a steam chest at 95% RH at 45° C. for a residence time of 2 seconds. The orienting gap was 250 μm and the draw ratio was 3.8. The nip rolls on the first and second orientation rolls nipped the film to the orientation rolls at a force of 33 N/cm length of nip roll. The film was wound up at a line speed of 1.27 m/s.

The oriented film so produced was then tested to determine its ultimate tensile strength, modulus, Graves tear strength, Elmendorf tear strength and Gelbo flex. The results are shown in the following table, which also shows comparative results for nylon 66, having an RV of 42, similarly extruded, moisturized and oriented, but at a draw ratio of 4.1.

| | UTS (psi) MD | UTS (psi) TD | Modulus (psi) MD | Modulus (psi) TD | Graves Tear (g/mil) MD | Graves Tear (g/mil) TD | Elmendorf Tear (g/mil) MD | Elmendorf Tear (g/mil) TD | Gelbo Flex (pinholes/100 in$^2$) |
| --- | --- | --- | --- | --- | --- | --- | --- | --- | --- |
| nylon 66/6 blend | 41 000 | 8500 | 305 000 | 270 000 | 775 | 790 | 170 | 150 | 59 |
| nylon 66 | 50 080 | 7728 | 464 000 | 436 000 | 1362 | 1012 | 139 | 99 | 106 |

EXAMPLE II

The procedure of Example I was repeated with a blend of 80% nylon 66 and 20% nylon 6 to produce a 51 μm film which was subsequently oriented as above at a draw ratio of 3.85. The results were as follows:

| UTS (psi) MD | UTS (psi) TD | Modulus (psi) MD | Modulus (psi) TD | Graves Tear (g/mil) MD | Graves Tear (g/mil) TD | Elmendorf Tear MD | Elmendorf Tear TD | Gelbo Flex (pinholes/100 in$^2$) |
| --- | --- | --- | --- | --- | --- | --- | --- | --- |
| 44000 | 6600 | 275 | 290 | 875 | 930 | 175 | 125 | 38 |

I claim:

1. An oriented nylon film made from a blend of nylon 66 and another nylon selected from the group consisting of nylon 6, nylon 11, nylon 12 and nylon 6,12, the weight proportions of nylon 66 to said other nylon being in the range of from 92:8 to 75:25, said nylon film having a moisture content of from about 0.75 to about 2.25 wt. %.

2. A film of claim 1 wherein the moisture content is from about 1.0 to about 2.0 wt. %.

3. A film of claim 2 wherein said other nylon is nylon 6.

4. A film of claim 2 having been monoaxially oriented in the machine direction at a draw ratio of between about 1.1 and 5.5.

5. A film of claim 2 having been monoaxially oriented in the machine direction at a draw ratio of between about 2.6 and 4.8.

6. A film of claim 1 wherein said other nylon is nylon 6.

7. A film of claim 1 having been monoaxially oriented in the machine direction at a draw ratio of between about 1.1 and 5.5.

8. A film of claim 1 having been monoaxially oriented in the machine direction at a draw ratio of between about 2.6 and 4.8.

9. A film laminate comprising an oriented nylon film and a sealant web, said nylon film being made from a blend of nylon 66 and another nylon selected from the group consisting of nylon 6, nylon 11, nylon 12 and nylon 6,12 the weight proportions of nylon 66 to said other nylon being in the range of from 92:8 to 75:25, said nylon film having a moisture content of from about 0.75 to about 2.25 wt. %.

10. A film laminate of claim 9 having a layer of crystalline vinylidene chloride copolymer between the oriented nylon film and the sealant web.

11. A film laminate of claim 9 wherein the sealant web is selected from the group consisting of polyethylene, ethylene-vinyl acetate copolymers, ionomers, PVC and blends thereof, said laminate having a layer of crystalline vinylidene chloride copolymer between the oriented nylon film and the sealant web.

* * * * *